United States Patent
Lensing et al.

(10) Patent No.: US 7,337,034 B1
(45) Date of Patent: Feb. 26, 2008

(54) METHOD AND APPARATUS FOR DETERMINING A ROOT CAUSE OF A STATISTICAL PROCESS CONTROL FAILURE

(75) Inventors: Kevin R. Lensing, Austin, TX (US); Ernest Dean Adams, III, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 184 days.

(21) Appl. No.: 11/220,436

(22) Filed: Sep. 7, 2005

(51) Int. Cl.
*G06F 19/00* (2006.01)

(52) U.S. Cl. ............... 700/121; 700/109; 700/110

(58) Field of Classification Search ............ 700/90, 700/95, 109–110, 117, 121; 438/14; 382/149
See application file for complete search history.

(56) References Cited

U.S. PATENT DOCUMENTS

| | | | | |
|---|---|---|---|---|
| 6,263,255 B1 * | 7/2001 | Tan et al. | ............... | 700/121 |
| 6,441,620 B1 * | 8/2002 | Scanlan et al. | ............ | 324/459 |
| 6,470,231 B1 * | 10/2002 | Yang et al. | ............... | 700/121 |
| 6,563,300 B1 * | 5/2003 | Jackson et al. | .......... | 324/158.1 |
| 6,778,873 B1 * | 8/2004 | Wang et al. | ............... | 700/110 |
| 6,946,303 B2 * | 9/2005 | Flanner et al. | ............... | 438/14 |
| 6,980,873 B2 * | 12/2005 | Shen | ............... | 700/108 |
| 7,062,411 B2 * | 6/2006 | Hopkins et al. | ............ | 702/185 |

* cited by examiner

*Primary Examiner*—Alexander Kosowski
(74) *Attorney, Agent, or Firm*—Williams, Morgan & Amerson

(57) ABSTRACT

The present invention provides a method and apparatus for determining a root cause of a fault. The method includes detecting at least one fault associated with at least one first wafer processed according to a first processing context and processing at least one second wafer according to at least one second processing context. The second processing context is different than the first processing context. The method also includes determining a root cause associated with the fault based on the first processed wafer and the second processed wafer.

23 Claims, 2 Drawing Sheets

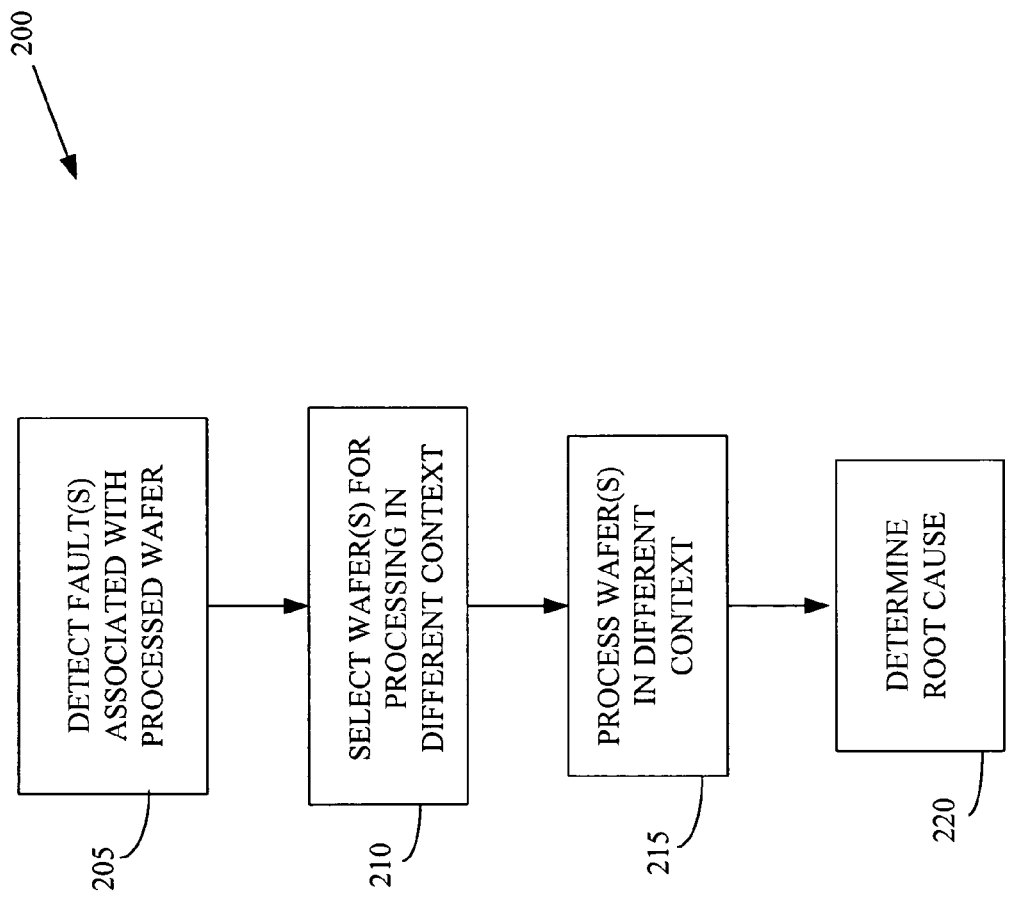

METHOD AND APPARATUS FOR DETERMINING A ROOT CAUSE OF A STATISTICAL PROCESS CONTROL FAILURE

BACKGROUND OF THE INVENTION

1. Field of the Invention

This invention relates generally to semiconductor processing, and, more particularly, to determining a root cause of a statistical process control failure during semiconductor processing.

2. Description of the Related Art

To fabricate a semiconductor device, a wafer is typically processed in numerous processing tools in a predetermined sequence. The processing tools may include photolithography steppers, etch tools, deposition tools, polishing tools, rapid thermal processing tools, implantation tools, and the like. Each processing tool modifies the wafer according to a particular operating recipe. For example, a photolithography stepper may be used to form a patterned layer of photoresist above the wafer. Features in the patterned layer of photoresist correspond to a plurality of features, e.g. gate electrode structures, which will ultimately be formed above the surface of the wafer. The tool sequence, as well as the recipes used by the tools, must be carefully controlled so that the features formed on the wafer meet appropriate design and performance criteria. Thus, statistical process control (SPC) systems are often used to coordinate operation of the processing tools.

In operation, the conventional SPC system initiates a control script based upon a manufacturing model, which can be a software program that automatically retrieves data needed to execute a manufacturing process, and transmits one or more control messages, such as an operating recipe, to the processing tools. The conventional SPC system may also provide control messages that are used to dispatch wafers or wafer lots to the processing tools, which may process the wafers or wafer lots according to the operating recipe. The processing tools may include one or more sensors to collect data associated with operation of the processing tool. For example, an etching tool may include a sensor to monitor the radio frequency power delivered by the etching tool. The data acquired by the various sensors may be referred to as tool trace data. Wafer state data indicative of the physical state of one or more wafers may also be collected by various devices within the SPC system. For example, one or more metrology tools may be used to perform measurements on selected wafers after they have been processed by one or more processing tools. The measurements may include measurements of a thickness of a layer of material formed on the wafer, a critical dimension (CD) of one or more features formed on the wafer, and the like.

The collected tool trace data and/or wafer state data, as well as other types or data, may be provided to the SPC system, which may use the collected data for various purposes such as fault detection and/or classification. An SPC fault (or failure event) occurs when one or more measurements are outside the control limits for a particular measurement point. For example, the tool trace data collected by a thermocouple in a rapid thermal anneal tool may indicate that the temperature within the tool has dropped below a desired temperature threshold, indicating a possible SPC fault. For another example, the wafer state data collected by a metrology tool may indicate that a mean critical dimension of one or more features exceeds a desired threshold value for the mean critical dimension, indicating a possible SPC fault.

Fabrication facilities typically operate in or near a steady state condition, and so many wafers or wafer lots may be processed by the same sequence of processing tools according to the same recipe. An SPC fault may therefore affect many wafers if it is not detected and corrected quickly. However, the data collected by conventional APC systems may not expedite the detection of a root cause of an SPC fault, at least in part because the SPC system typically runs in the steady state and so may continue to process wafers or wafer lots according to the same processes that led to the SPC fault. Consequently, little or no new information related to the SPC fault may be produced by the convention SPC system. Engineers may shut down portions of the fabrication process to perform tests that may be used to determine the root cause, but this laborious and time-consuming approach may lead to undesirable down-time that may reduce the efficiency of the fabrication facility.

The present invention is directed to addressing the effects of one or more of the problems set forth above.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the instant invention, a method is provided for determining a root cause of a fault. The method includes detecting at least one fault associated with at least one first wafer processed according to a first processing context and processing at least one second wafer according to at least one second processing context. The second processing context is different than the first processing context. The method also includes determining a root cause associated with the fault based on the first processed wafer and the second processed wafer.

In another embodiment of the present invention, an apparatus is provided for determining a root cause of a fault. The apparatus includes at least one processing tool for processing wafers according to a processing context. The apparatus also includes a controller configured to detect at least one fault associated with at least one first wafer processed according to a first processing context and dispatch at least one second wafer to the processing tool for processing according to at least one second processing context. The second processing context is different than the first processing context. The controller is also configured to determine a root cause associated with the fault based on the first processed wafer and the second processed wafer.

BRIEF DESCRIPTION OF THE DRAWINGS

The invention may be understood by reference to the following description taken in conjunction with the accompanying drawings, in which like reference numerals identify like elements, and in which:

FIG. 2 conceptually illustrates one exemplary embodiment of a method of determining a root cause of the fault associated with a processed wafer, in accordance with the present invention.

Figure 1:
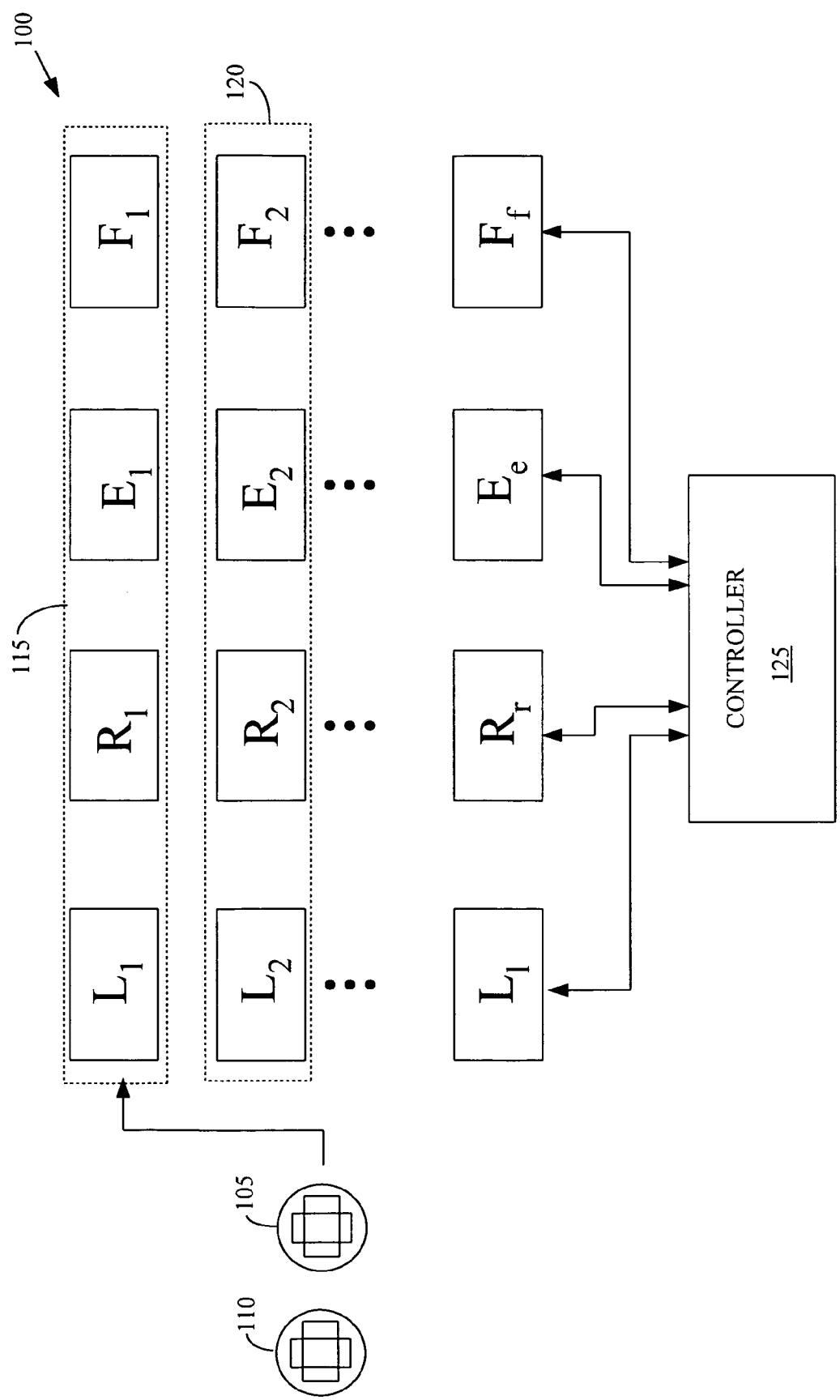
FIG. 1 shows a simplified block diagram of an illustrative manufacturing system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 shows a simplified block diagram of an illustrative manufacturing system 100. In the illustrated embodiment, the manufacturing system 100 is adapted to fabricate semiconductor devices in or on one or more wafers 105, 110. Persons of ordinary skill in the art having benefit of the present disclosure should appreciate that, in various embodiments, the wafers 105, 110 may represent individual wafers, multiple wafers, one or more wafer lots, or any other number and/or grouping of wafers. Although the invention is described as it may be implemented in a semiconductor fabrication facility, the invention is not so limited and may be applied to other manufacturing environments. The techniques described herein may be applied to a variety of workpieces or manufactured items, including, but not limited to, microprocessors, memory devices, digital signal processors, application specific integrated circuits (ASICs), or other similar devices. The techniques may also be applied to workpieces or manufactured items other than semiconductor devices.

The manufacturing system 100 includes a plurality of tools $L_{1-l}$, $R_{1-r}$, $E_{1-e}$, $F_{1-f}$. The tools $L_{1-l}$, $R_{1-r}$, $E_{1-e}$, $F_{1-f}$ are grouped into sets of like tools, as denoted by letters L, R, E, and F. In the illustrated embodiment, the set of tools, $L_{1-l}$, represent lithography tools; the set of tools, $R_{1-r}$, represent reticle tools; the set of tools, $E_{1-e}$, represent etching tools; and the set of tools $F_{1-f}$ represent metrology tools for measuring a final inspection critical dimension (FICD) associated with structures (such as gate electrode structures) formed on the wafers 105, 110. The tools $L_{1-l}$, $R_{1-r}$, $E_{1-e}$, $F_{1-f}$ are depicted in a rank and file grouping for illustrative purposes only. In an actual implementation, the tools $L_{1-l}$, $R_{1-r}$, $E_{1-e}$, $F_{1-f}$ may be arranged in any physical order or grouping. Persons of ordinary skill in the art should also appreciate that the manufacturing system 100 may include any number of the tools $L_{1-l}$, $R_{1-r}$, $E_{1-e}$, $F_{1-f}$ as well as additional tools that are not depicted in FIG. 1. In the illustrated embodiment, the tools $L_{1-l}$, $R_{1-r}$, $E_{1-e}$, $F_{1-f}$ may be grouped into one or more threads 115, 120. As used herein and in accordance with common usage in the art, the terms "thread" or "processing thread" will be understood to refer to the upstream process entities that may affect a measurement associated with a wafer that has been processed by the entities in the thread.

A controller 125 controls processing of the wafers 105, 110 by the tools $L_{1-l}$, $R_{1-r}$, $E_{1-e}$, $F_{1-f}$ in the manufacturing system 100. In the illustrated embodiment, the controller 125 determines a processing context that may be used to process each of the wafers 105, 110. As used herein, the term "processing context" will be understood to refer to any portion of the processing parameters and/or processing environment that affects the structure and/or operation of features and/or devices that are formed in or on the processed wafers 105, 110. Exemplary portions of the processing context that may be used when processing the wafers 105, 110 include, but are not limited to, a product design, a processing thread, a processing tool, an operating recipe, one or more parameters of the operating recipe, and the like. Accordingly, the controller 125 may determine and/or access information indicative of the processing context associated with the wafers 105, 110, such as the product design that should be used in processing the wafers 105, 110, the thread that should be used to process the wafers 105, 110, operating recipes that should be used by the tools to process the wafers 105, 110, and the like. The information indicative of the processing context may then be provided to the appropriate tools $L_{1-l}$, $R_{1-r}$, $E_{1-e}$, $F_{1-f}$ and the wafers 105, 110 may be dispatched to the tools $L_{1-l}$, $R_{1-r}$, $E_{1-e}$, $F_{1-f}$ based on the processing context.

In the illustrated embodiment, the wafer 105 is processed by the tools $L_1$, $R_1$, $E_1$, $F_1$, in the thread 115, and so the processing context for the wafer 105 includes the tools $L_1$, $R_1$, $E_1$, $F_1$ and the thread 115. For example, lithography may be performed on the wafer 105 using the lithography tool $L_1$, a reticle or mask may be determined based on the product design using the reticle tool $R_1$, and a portion of the wafer 105 (or one or more layers formed above the wafer 105) may be etched through the mask using the etching tool $E_1$. Following the etching step, one or more critical dimensions of one or more structures formed in or on the wafer 105 may be measured using the FICD tool $F_1$.

Measurements performed by the FICD tool $F_1$ may be provided to the controller 125, which may use the measurements to determine whether or not there is a fault associated with the processed wafer 105. For example, the controller 125 may compare the measured FICD to a threshold, a target, or a control limit associated with the FICD. If measured value of the FICD exceeds the threshold or target, or is outside the control limit, the controller 125 may determine that there is a fault associated with the processed wafer 105. Persons of ordinary skill in the art having benefit of the present disclosure should appreciate that this embodiment is intended to be illustrative and not to limit the present invention. In alternative embodiments, any number of measurements of any type performed by any tool, as well as other information related to processing the wafer, may be used to detect faults.

The controller 125 may then determine a root cause of the fault. As used herein, the term "root cause" will be understood to refer to one or more portions of the processing context that may directly and/or indirectly result in a fault associated with the processed wafer 105. The root cause of the fault may also be referred to as a source of a measurement error because the fault may be detected and/or manifested in one or more measurements performed on the processed wafer 105, as discussed above. In various alternative embodiments, the root cause may be found in a product design, a processing thread, a processing tool, an operating recipe, or any combination thereof. However, persons of ordinary skill in the art should appreciate that these potential root causes are intended to be exemplary and not to limit the present invention.

FIG. 2 conceptually illustrates one exemplary embodiment of a method 200 of determining a root cause of the fault associated with a processed wafer 105. In the illustrated embodiment, at least one fault associated with the processed wafer 105 is detected (at 205). For example, as discussed above, measurements performed by a FICD tool $F_{1-f}$ may be used to detect (at 205) a fault associated with the processed wafer 105. In response to detecting (at 205) the fault associated with the processed wafer 105, the controller 125 may select (at 210) one or more additional wafers 110 for processing according to a processing context that differs from the processing context used in processing the wafer 105. In one embodiment, the controller may select (at 210) wafers 110 that are scheduled to be processed according to the same processing context of the wafer 105 and may then modify the original processing context to generate the new processing context that is to be used when processing the wafers 110. Alternatively, the controller 125 may select (at 210) one or more additional wafers 110 for processing based on a previously determined processing context associated with the wafers 110 that differs from the processing context used in processing the wafer 105.

The selected wafers 110 are then processed (at 215) according to the modified (relative to the processing context used to process the wafer 105) processing context. In one embodiment, the selected wafers 110 may be processed at a higher priority than other wafers that are not scheduled to be processed according to the modified processing context. The controller 125 may also modify a sampling plan so that the selected wafers 110 are sampled at a higher rate than other wafers that may be processed by the manufacturing system 100. For example, the controller 125 may modify the sampling plan so that all of the selected wafers 110 are sampled by at least one of the FICD tools $F_{1-f}$. By sampling the selected wafers 110, the controller 125 may determine whether or not there is a fault associated with one or more of the additional wafers 110.

The root cause of the fault associated with the wafer 105 may then be determined (at 220) based on the fault associated with the processed wafer 105 and the faults (or absence thereof) associated with one or more of the additional processed wafers 110, which were processed according to a different processing context. In one embodiment, the root cause of the fault may be determined (at 220) by applying a commonality analysis to the fault associated with the processed wafer 105 and the faults (or absence of faults) associated with one or more of the additional processed wafers 110. The commonality analysis may be applied on a wafer-by-wafer basis or in a statistical sense. For example, a persistent root cause may be identified by process of elimination as wafers 110 are processed in different processing contexts. Alternatively, intermittent root causes may be identified by processing a plurality of wafers 110 according to each processing context and determining that a probability of a particular root cause exceeds a selected threshold.

In one exemplary embodiment, one or more faults are detected (at 205) in one or more wafers in wafer lot A, which was processed by the thread:

$$THREAD_{Lot\,A} = L_1 + R_3 + E_2 + F_1$$

Thus, the root cause may be in any of the tools $L_1$, $R_3$, $E_2$, or $F_1$. The controller 125 may therefore select (at 210) additional wafer lots that are to be processed by different threads, i.e., the additional wafer lots have different processing contexts than the wafers in wafer lot A. For example, wafer lots B-G may be scheduled for processing according to the threads:

$$THREAD_{Lot\ B} = L_1 + R_2 + E_4 + F_1$$

$$THREAD_{Lot\ C} = L_2 + R_2$$

$$THREAD_{Lot\ D} = L_1 + R_3$$

$$THREAD_{Lot\ E} = L_1 + R_3 + E_2$$

$$THREAD_{Lot\ F} = L_2 + R_3$$

$$THREAD_{Lot\ G} = L_1 + R_1$$

The controller 125 may tag lot E and prioritize lot E for dispatching to be processed by the associated thread, $THREAD_{Lot\ E}$. The thread used to process wafers in lot E is the same as the thread used to process wafers in lot A, except that the wafers in lot E are not provided to the FICD tool $F_1$. Accordingly, if no fault is detected in the wafers in lot E, then the root cause of the fault may be determined (at 220) to be the FICD tool $F_1$. However, if a fault is detected in the wafers in lot E, then the root cause of the fault may not be the FICD tool $F_1$. The additional fault may also confirm the out-of-control state of the process thread.

The controller 125 may dispatch lot D, which is processed by the lithography tool $L_1$ and the reticle tool $R_3$, to an etcher that is different than the etcher $E_2$ that was used to process the wafers in lot A. If no fault is detected in the wafers in lot D, then the root cause of the fault may be determined (at 220) to be the etching tool $E_2$. However, if a fault is detected in the wafers in lot D, then the root cause of the fault may not be the etching tool $E_2$. Similarly, lot G may be prioritized for processing to determine (at 220) whether or not the reticle tool $R_3$ is the root cause of the fault, and lot F may be prioritized for processing to determine (at 220) whether or not the lithography tool $L_1$ is the root cause of the fault.

Although the exemplary embodiment described above varies the processing context associated with the wafers by selecting wafers that are processed by different threads, persons of ordinary skill in the art should appreciate that the present invention is not limited to varying the processing context by varying the processing thread. As discussed above, the processing context refers to any portion of the processing parameters and/or processing environment that affects the structure and/or operation of features and/or devices that are formed in or on the processed wafers 105, 110. In various alternative embodiments, the processing context may therefore be varied by varying a product design, a processing thread, a processing tool, an operating recipe, and the like. Moreover, the processing context associated with the wafers 105, 110 may be varied by changing combinations of the product design, the processing thread, the processing tool, the operating recipe, and the like. Thus, root causes associated with the interaction of different portions of the processing context may also be diagnosed.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
    detecting at least one fault associated with at least one first wafer processed according to a first processing context, the first processing context comprising a first plurality of processing tools;
    processing at least one second wafer according to at least one second processing context, said at least one second processing context comprising at least one second plurality of processing tools, said at least one second plurality of processing tools being different than said at least one first plurality of processing tools; and
    determining a root cause associated with said at least one fault based on said at least one first processed wafer and said at least one second processed wafer, the root cause being associated with one of the first plurality of processing tools.

2. The method of claim 1, wherein detecting said at least one fault associated with said at least one first wafer comprises performing at least one measurement on said at least one first wafer.

3. The method of claim 2, wherein detecting said at least one fault comprises comparing said at least one measurement to at least one control limit.

4. The method of claim 1, wherein processing said at least one second wafer according to said at least one second processing context comprises selecting said at least one second wafer for processing according to said at least one second processing context based upon said at least one first processing context such that at least one of the second plurality of processing tools is different than at least one of the first plurality of processing tools.

5. The method of claim 1, wherein processing said at least one second wafer according to said at least one second processing context comprises selecting said at least one second wafer for processing according to at least one second processing context, the number of processing tools in said at least one second processing context being different from the number of processing tools in said at least one first processing context.

6. The method of claim 1, wherein processing said at least one second wafer according to said at least one second processing context comprises selecting said at least one second wafer such that at least one of a product design, a thread, a processing tool, and an operating recipe associated with said at least one second processing context differs from at least one corresponding product design, thread, processing tool, and operating recipe associated with said at least one first processing context.

7. The method of claim 1, wherein processing said at least one second wafer comprises dispatching said at least one second wafer for processing according to said at least one second processing context.

8. The method of claim 7, wherein dispatching said at least one second wafer comprises dispatching said at least one second wafer according to a determined priority.

9. The method of claim 1, wherein determining the root cause associated with said at least one fault comprises determining whether a fault is associated with said at least one second processed wafer.

10. The method of claim 9, wherein determining the root cause comprises performing a commonality analysis based on the at least one fault associated with said at least one first processed wafer and on whether a fault is associated with said at least one second processed wafer.

11. The method of claim 1, wherein determining the root cause associated with said at least one fault comprises modifying at least one sampling plan.

12. An apparatus, comprising:
at least one processing tool for processing wafers according to a processing context; and
a controller configured to:
   detect at least one fault associated with at least one first wafer processed according to a first processing context, the first processing context comprising a first plurality of processing tools;
   dispatch at least one second wafer to said at least one processing tool for processing according to at least one second processing context, said at least one second processing context comprising at least one second plurality of processing tools, said at least one second plurality of processing tools being different than said at least one first plurality of processing tools; and
   determine a root cause associated with said at least one fault based on said at least one first processed wafer and said at least one second processed wafer, the root cause being associated with one of the first plurality of processing tools.

13. The apparatus of claim 12, comprising at least one measurement tool for performing at least one measurement on processed wafers, wherein said at least one measurement tool is configured to perform at least one measurement on said at least one first wafer.

14. The apparatus of claim 13, wherein the controller is configured to detect said at least one fault associated with said at least one first wafer based on said at least one measurement performed on said at least one first wafer.

15. The apparatus of claim 14, wherein the controller is configured to compare said at least one measurement to at least one control limit.

16. The apparatus of claim 12, wherein the controller is configured to select said at least one second wafer for processing according to said at least one second processing context based upon said at least one first processing context such that at least one of the second plurality of processing tools is different than at least one of the first plurality of processing tools.

17. The apparatus of claim 12, wherein the controller is configured to select said at least one second wafer for processing according to at least one second processing context, the number of processing tools in said at least one second processing context being different from the number of processing tools in said at least one first processing context.

18. The apparatus of claim 12, wherein the controller is configured to select said at least one second wafer such that at least one of a product design, a thread, a processing tool, and an operating recipe associated with said at least one second processing context differs from at least one corresponding product design, thread, processing tool, and operating recipe associated with said at least one first processing context.

19. The apparatus of claim 12, wherein the controller is configured to dispatch said at least one second wafer according to a determined priority.

20. The apparatus of claim 12, wherein the controller is configured to determine whether a fault is associated with said at least one second processed wafer.

21. The apparatus of claim 20, wherein the controller is configured to perform a commonality analysis based on the at least one fault associated with said at least one first processed wafer and on whether a fault is associated with said at least one second processed wafer.

22. The apparatus of claim 12, wherein the controller is configured to modify at least one sampling plan.

23. An apparatus, comprising:
means for detecting at least one fault associated with at least one first wafer processed according to a first processing context, the first processing context comprising a first plurality of processing tools;
means for processing at least one second wafer according to at least one second processing context, said at least one second processing context comprising at least one second plurality of processing tools said at least one second plurality of processing tools being different than said at least one first plurality of processing tools; and
means for determining a root cause associated with said at least one fault based on said at least one first processed wafer and said at least one second processed wafer, the root cause being associated with one of the first plurality of processing tools.

* * * * *